United States Patent [19]  [11] 4,368,708
Fried et al. [45] Jan. 18, 1983

[54] POSITIONING DEVICE FOR AN AIR VALVE ARRANGED IN THE CHARGING AIR LINE OF AN INTERNAL COMBUSTION ENGINE

[75] Inventors: Reinhard Fried, Nussbaumen, Switzerland; Rudolf Heller, Munich; Heimo Hübner, Greifenberg, both of Fed. Rep. of Germany

[73] Assignee: BBC Brown, Boveri & Company Limited, Baden, Switzerland

[21] Appl. No.: 189,367

[22] Filed: Sep. 22, 1980

[30] Foreign Application Priority Data

Jan. 11, 1979 [DE] Fed. Rep. of Germany ....... 2901082
May 19, 1980 [EP] European Pat. Off. ... 80020040090.3

[51] Int. Cl.³ .......................................... F02M 39/00
[52] U.S. Cl. ............................... 123/452; 123/198 D; 123/DIG. 11
[58] Field of Search ... 123/198 D, 198 DB, DIG. 11, 123/394, 452

[56] References Cited

U.S. PATENT DOCUMENTS

| 3,894,523 | 7/1975 | Stumpp | 123/452 |
| 3,930,481 | 1/1976 | Eckert | 123/452 |
| 4,015,571 | 4/1977 | Stumpp | 123/452 |
| 4,064,854 | 12/1977 | Fehrenbach et al. | 123/452 |
| 4,143,631 | 3/1979 | Stumpp | 123/452 |
| 4,227,502 | 10/1980 | Steinwart et al. | 123/452 |

Primary Examiner—Ira S. Lazarus
Attorney, Agent, or Firm—Werner W. Kleeman

[57] ABSTRACT

A positioning device for an air valve arranged in the charging air line of a diesel engine, particularly charged by means of a pressure wave-charging device. The air valve or flap is provided with a shutoff valve incorporated into the flow path between an impingement line branching-off from a pressure oil line of the diesel engine and an oil return flow line. The impingement line is connected with an impingement chamber for a positioning piston actuating the air valve or flap. The positioning piston is loaded by a continuously effective force and the shutoff valve is actuated, in order to impinge the positioning piston with oil, in the opening direction of the air valve or flap by a control piston loaded by the pressure in the air charging line against the force of a spring. The shutoff valve interposed between the impingement chamber and the oil return flow line, in the presence of an oil pressure for impinging the positioning piston with pressurized oil, is moved by the charging air pressure in the charging air line out of its open position into its closed position, and the closed shutoff valve, only in the absence of oil pressure for oil pressure relief of the positioning piston, can be controlled by the spring force from its closed position into the open position.

12 Claims, 3 Drawing Figures

POSITIONING DEVICE FOR AN AIR VALVE ARRANGED IN THE CHARGING AIR LINE OF AN INTERNAL COMBUSTION ENGINE

BACKGROUND OF THE INVENTION

The present invention relates to a new and improved construction of a positioning or adjustment device for an air valve or air flap member arranged in the charging air line or conduit of a diesel engine, particularly a diesel engine charged by a pressure wave-charging device.

In its more particular aspects the positioning device of the present development is of the type wherein a shutoff valve is incorporated into the flow path between an impingement line branching-off of the pressure oil line of the diesel engine and an oil return flow line. The impingement line or conduit is connected with an impingement chamber for a positioning or adjustment piston actuating the air valve or flap member, this positioning piston, in turn, being loaded by a continuously effective force. The shutoff valve can be activated by a control piston loaded by the pressure in the charging air line against the force of a spring, in order to impinge with pressurized oil the positioning piston in the opening direction of the air valve.

A positioning device of the previously mentioned type is already known to the art from German patent publication No. 2,631,257, published Jan. 26, 1978, wherein the shutoff valve is actuated in the opening direction by a control piston loaded in such switching direction by the pressure prevailing in the charging air line against the force of a spring. Only in the absence of any oil pressure is the shutoff valve closed, whereby then this shutoff valve only can be closed in the rest position of the positioning piston, where the air valve is closed, in the absence of oil pressure.

With such construction of positioning or adjustment device there is ensured that the air valve or flap, upon starting the engine, remains closed, and only upon exceeding for the first time the idling rotational speed following the starting operation, does this valve remain open during the entire running time of the engine, and also during renewed engine idling, until the engine is again turned-off.

SUMMARY OF THE INVENTION

It is a primary object of the present invention to provide a new and improved construction of positioning device of the previously mentioned type which, in contrast to the prior art positioning device, is appreciably simpler in construction, and therefore, also possesses increased operational reliability and requires less space.

Still a further significant object of the present invention aims at providing a new and improved construction of positioning device for an air valve or flap member arranged in an air charging line of a diesel engine, wherein such positioning device can be mounted directly at the motor housing or at the suction air line near to the air valve or flap member.

Now in order to implement these and still further objects of the invention, which will become more readily apparent as the description proceeds, the positioning device of the present development is manifested by the features that the shutoff valve which is incorporated between the impingement chamber and the oil return flow line, is moved out of its open position into its closed position by the charging air pressure in the charging air line when there is present oil pressure in order to impinge the positioning or adjustment piston with pressurized oil, and the closed shutoff valve is controlled by spring force from its closed position into its open position only upon absence of oil pressure in order to relieve the positioning piston from the action of the pressurized oil.

BRIEF DESCRIPTION OF THE DRAWINGS

The invention will be better understood and objects other than those set forth above, will become apparent when consideration is given to the following detailed description thereof. Such description makes reference to the annexed drawings showing therein two exemplary embodiments, and wherein throughout the various Figures of such drawings there have been conveniently used the same reference characters to denote the same or analogous elements, and wherein.

DETAILED DESCRIPTION OF THE PREFERRED EMBODIMENTS

Before specifically describing the drawings, it is indicated that in the aforementioned German patent publication No. 2,631,257 there has been shown a schematic arrangement of a positioning device of the prior art used in conjunction with a diesel engine and a pressure wave-charging device, and in which arrangement there also can be used the improved positioning device of the present development. Therefore, in order to simplify the showing of the drawings it is to be assumed that the constructions of positioning device disclosed herein can be used in the environment of a diesel engine and a pressure wave-charging device of the type disclosed in the aforementioned German patent publication, to which reference may be readily had and the disclosure of which is incorporated herein by reference.

Figure 1:
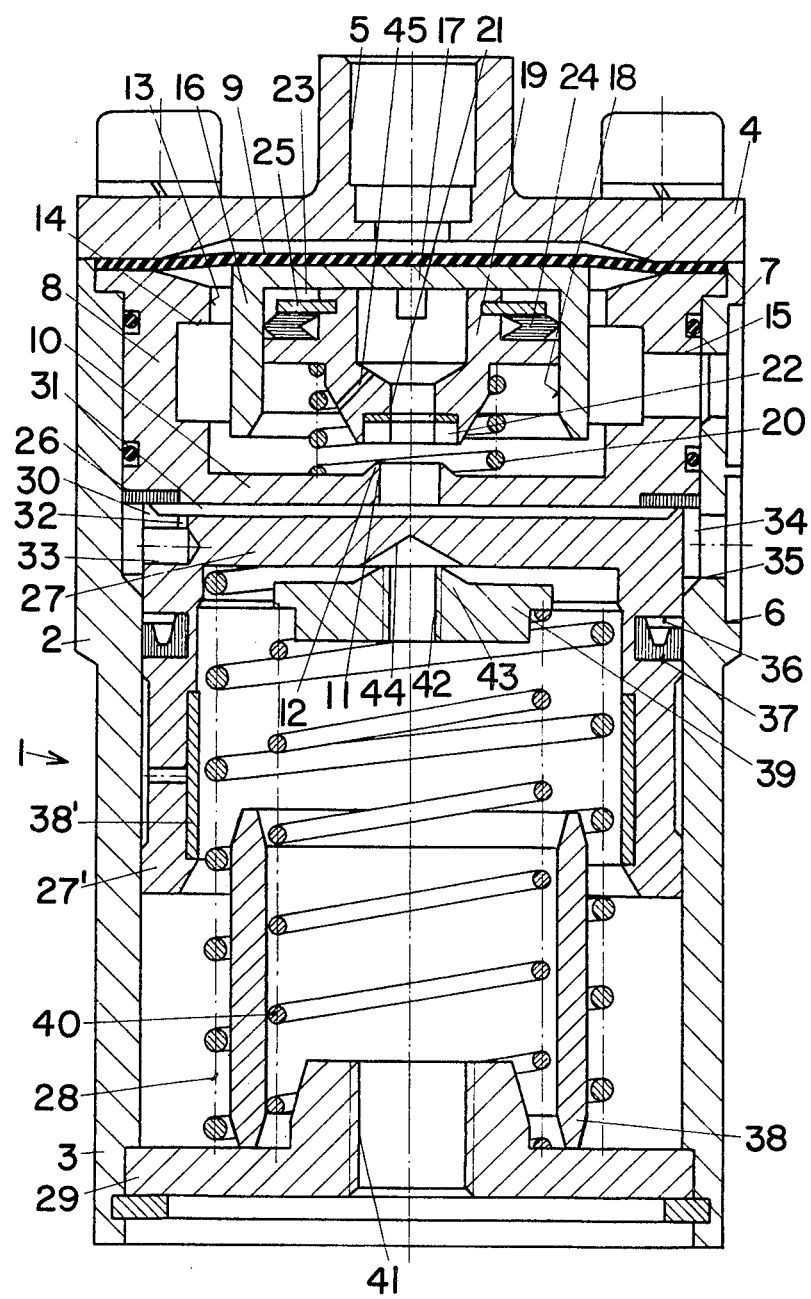
FIG. 1 is a sectional view through a first embodiment of positioning device shown on an enlarged scale and constructed according to the invention.

Turning attention now specifically to FIG. 1, there will be seen a first exemplary embodiment of positioning or adjustment device which comprises a lengthwise extended or elongate housing 1 whose for instance square housing portion or section 2, as shown in the upper portion of the illustration, has a quadratic external cross-sectional configuration. Merging with the housing portion 2, at the lower portion or side of the showing of FIG. 1, is a stepped cylindrical housing portion 3. The housing portion 2 is closed by a cover member or cover 4 having a connection or port 5 leading to an air charge line in the flow direction before the air flap valve or valve member, such as air valve 47 shown in FIG. 3. At the one longitudinal side of the square housing portion 2 there are located both of the connections or ports 6 and 7 for the oil impingement or infeed line and the oil return flow line which have here not been particularly shown.

Between the cover member 4 and the housing portion 2 as well as between a housing insert portion or element 8 there is incorporated a diaphragm or membrane 9. The internal space of the housing portion 2 is of substantially cylindrical configuration. The housing insert element 8 is sealingly inserted by means of a cylindrical outer circumferential portion into the housing portion 2. The housing insert element 8 is constructed as a sleeve or bushing which is open with respect to the membrane 9, and such sleeve has a base or bottom 10 having a central opening 11 which is surrounded with regard to the internal space of the sleeve insert 8 by an edge forming a valve seat 12. At the cylindrical inner wall 13 of the housing insert element 8 there is located a continuous groove 14, with which merges a bore 15 which is in flow communication with the connection or port 7 for the not particularly illustrated oil return flow line.

Guided to be axially displaceable within the housing insert element 8 is a square sleeve 16 bearing by means of its sleeve base 17 at the membrane or diaphragm 9. Instead of using a groove or annulus 14 there can be provided an appropriate groove at the periphery of the square sleeve 16. Within the square sleeve 16 having a cylindrical inner wall 18, and which sleeve 16 is open with respect to the base 10 of the housing insert element 8, there is guided to be axially displaceable a control piston 19. This control piston 19 is loaded by a spring 20 or equivalent structure which bears against the base 10 of the housing insert element 8. The control piston 19 possesses a central opening or aperture 21 and retains a sealing disk 22 at a protruding piston portion which confronts the valve seat 12. This sealing disk 22 together with the valve seat 12 forms a shutoff valve 12, 22.

In a ring-shaped recess 23 provided at the outer circumference or surface of the control piston 19 there is retained a sealing ring 24 which, in the embodiment under discussion, is retained between the walls of the ring-shaped recess 23 and an inserted securing disk 25.

The base 10 of the housing insert element 8 carries at its side confronting the shutoff valve 12, 22 a sealing disk 26 or equivalent structure, details of which will be considered more fully hereinafter.

A positioning or adjustment piston 27 is guided within the cylinder portion or section 3 of the housing 1 in the cylindrical internal chamber of space thereof. Pressing against the positioning or adjustment piston 27 is a spring 28 or equivalent structure which, in turn, bears against a housing base or closure 29, by means of which the housing 1 is closed. In the illustrated rest position of the positioning piston 27 it is sealingly pressed against the sealing disk 26 at the base 10 of the housing insert element 8 by the force of the spring 28 by means of its axially protruding piston edge 30.

The positioning piston 27 delimits an impingement chamber or compartment 31 which, in the rest position of the positioning piston 27 only flow communicates with an annular or ring-shaped housing compartment 34 by means of a narrow bore 32 which is in flow communication with a connection bore 33 in the positioning piston 27. The ring-shaped housing chamber or compartment 34 flow communicates by means of a housing bore 35 with the connection or port 6 for the oil infeed or impingement line. As mentioned, the oil infeed line and the oil return flow line have not here been shown in the drawings to simplify the illustration, but are well known from the aforementioned German patent publication No. 2,631,257.

At the outer circumference of the positioning piston 27 there is inserted a sealing ring 37 in a groove 36. The positioning piston 27 is displaceable, against the force of the spring 28, until reaching an impact or stop ring 38 or equivalent structure. The thus limited piston stroke is adequate in order to bring the here not particularly illustrated air flap valve or valve located in the suction line out of its closed position into its open position.

The air flap valve or air valve, as is known, is secured to a shaft at which engages a lever for pivoting or rocking this air flap valve. The lever is connected with a conventional Bowden cable, the free end of which is connected with a pressure element 39, at which engages a spring 40 which likewise bears against the housing base 29. The not particularly illustrated conventional Bowden cable engages through a central opening 41 in the housing base or bottom 29. Within this opening 41 there is fixedly retained the outer sheath or jacket of the Bowden cable, whereas the end of the Bowden cable itself is attached at a central opening 42 of the pressure element 39. In the illustrated rest position of the pressure element 39, near to the positioning piston 27, the air flap valve is closed by the force of the spring 40. The impact or stop ring 38 advantageously serves to simultaneously act as a wear protection for both springs 28 and 40. An additional wear protection 38' for the spring 28 is located in a groove at the inner surface of the cylindrical piston guide portion 27' of the positioning piston 27.

Having now had the benefit of the foregoing discussion of the exemplary embodiment of positioning device shown in FIG. 1, its mode of operation will be described and is as follows:

With the diesel engine turned-off the oil infeed or impingement line connected in flow communication with the connection or port 6 and equally the line or conduit leading to the charging air line and extending up to the connection or port 5 are without pressure. The oil return line, leading to the connection or port 7, is continuously without pressure. With the diesel engine turned-off the positioning device assumes the rest position shown in FIG. 1, where the positioning piston 27 has been moved up to the sealing disk 26. The spring 28 is pre-biased in such a manner that the positioning piston 27 is sealingly pressed against the sealing disk 26.

Now if the engine is turned-on by means of the starter motor, then its oil pump begins to build up oil pressure in the oil infeed or impingement line. As a result, oil is fed through the bore 35, the housing ring-shaped chamber 34 and the bores 33 and 32 in the positioning piston 27 into the impingement chamber or compartment 31. From that location the pressurized oil flows by means of the shutoff valve 12, 22, which is retained in its open position by the spring 20, via the housing groove or channel 14 and the bore 15 to the oil return flow line connected with the connection or port 7. During the starting phase of the engine the individual components of the positioning device remain unaltered in the position shown in FIG. 1, i.e. the air flap valve remains closed.

During starting the engine, with the air flap valve closed, sucks-up the required quantity of air by means of a by-pass valve. As soon as the first ignition of the engine has been accomplished, such suddenly ejects in a surge-like fashion, at excess pressure, exhaust gases into the exhaust gas line. These exhaust gases arrive at a charging device and place such into operation. If the charging device is constructed as a conventional pressure-wave machine, then by virtue of the closed air flap valve it is possible, notwithstanding the flow connection present at the charging device between the exhaust gas line and the charging or boost air line, to prevent that any exhaust gas will be sucked-up into the charging air line, which otherwise would rapidly choke the just started engine and cause such to shutoff.

Due to placement of the charging device into operation by means of the expelled engine exhaust gases, pressure builds up in the charging air line due to the sucked-up fresh air, this pressure also appearing at the connection or port 5 by means of a line. As soon as there appears at the connection or port 5 a certain excess pressure of, for instance, about 0.2 bar, the diaphragm or membrane 9 is domed or arched towards the bottom of FIG. 1 against the force of the spring 20, with the result that the square sleeve 16 is likewise moved towards the bottom or downwardly in FIG. 1 along with the control piston 19 bearing at its sleeve base 17. Hence, the control piston 19 together with its sealing disk 22 presses against the valve seat 12, whereby the shutoff valve 12, 22 is closed. Due to closing of the shutoff valve 12, 22 there is interrupted the flow communication between the oil infeed or impingement line at the connection or port 6 and the oil return flow line at the connection or port 7. Therefore, there is built-up within the impingement chamber or space 31 a pressure which shifts the positioning piston 27 towards the left i.e. downwardly in the showing of FIG. 1, against the force of the spring 28, until contacting the impact or stop ring 38 and thereby opens the valve seat defined by the protruding piston edge 30. Hence, the positioning piston 27 travels against the pressure element 39 which, for centering purposes, engages by means of protruding surfaces 43 into a central recess 44 provided at the positioning piston 27 and together with the positioning piston 27 this pressure element 39 is shifted towards the left i.e. downwardly in the showing of FIG. 1 against the additional force of the spring 40. With this movement the not particularly illustrated air flap valve is rocked by means of the likewise not particularly illustrated Bowden cable attached to the pressure element 39 into its open position.

Simultaneous with the pressure build-up in the impingement chamber 31, which is disconnected from the connection or port 7, there also builds-up an appropriate oil pressure at the surfaces of the control piston 19 facing away from the valve seat 12. Hence, the control piston 19 is retained in the closed position of the shutoff valve 12, 22, whereas the square sleeve 16 is shifted towards the right i.e. upwardly in the showing of FIG. 1 against the membrane or diaphragm 9. The piston sealing ring 24 at the control piston 19 is designed in a manner ensuring that by means of such there is not established any flow communication at the connection or port 7 with the pressureless oil return flow line.

After completion of the starting phase of the diesel engine there is thus closed the shutoff valve 12, 22 by a first charging or boost air pulse, and hence the positioning piston 27 is shifted for opening the air valve. The air valve or flap thereafter remains open for such length of time as the engine is running, in other words as long as there prevails an adequate oil pressure at the connection or port 6, since the shutoff valve 12, 22 remains closed.

If the engine is turned-off then the oil pressure at the connection or port 6 collapses. The relaxing springs 40 and 28 displace the positioning piston 27 to the right of i.e. upwardly in FIG. 1 in the direction of its rest position, with the result that oil is expelled out of the impingement chamber or space 31 and through the opened shutoff valve 12, 22 back into the oil return flow line at the connection or port 7. For more quickly decreasing the pressure of the oil between the control piston 19 and the sleeve 16, a bore 45 is provided at the control piston 19, by means of which, upon collapse of the oil pressure at the connection or port 6, the shutoff valve 12, 22 rapidly and positively assumes its open position. Accordingly, the oil can be rapidly withdrawn out of the impingement chamber or space 31 through the connection or port 7, so that the positioning or adjustment piston 27 and the pressure element 29 again can be returned back into their illustrated rest positions, where the air flap valve is closed.

The positioning device is then again located in the illustrated starting position and the air flap valve is only controlled into its open position after a renewed phase of starting of the engine by delivering a predetermined air charging pulse to the connection or port 5.

Figure 2:
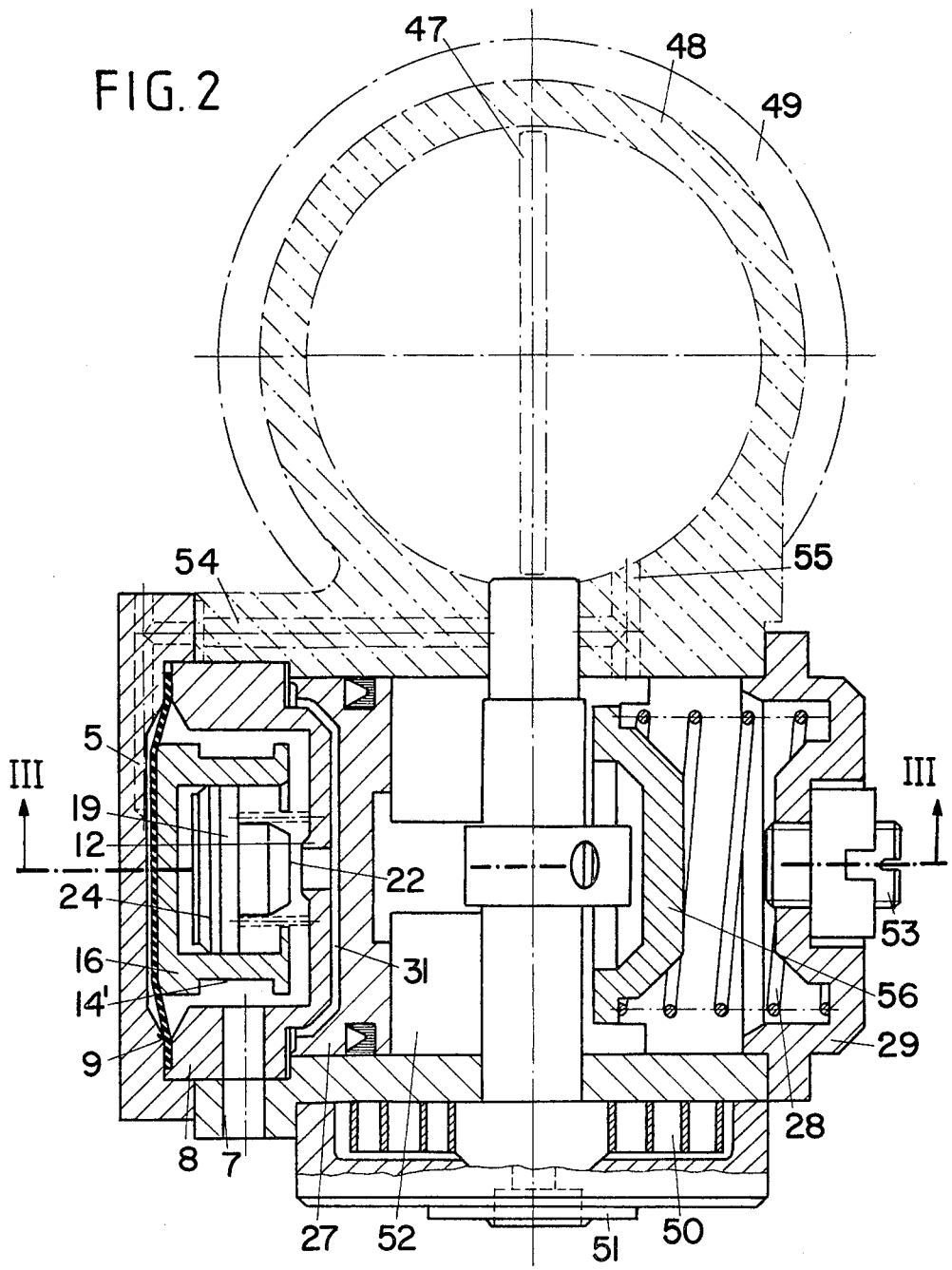
FIG. 2 is a sectional view, again on an enlarged scale, of a second embodiment of inventive positioning or adjustment device.
Figure 3:
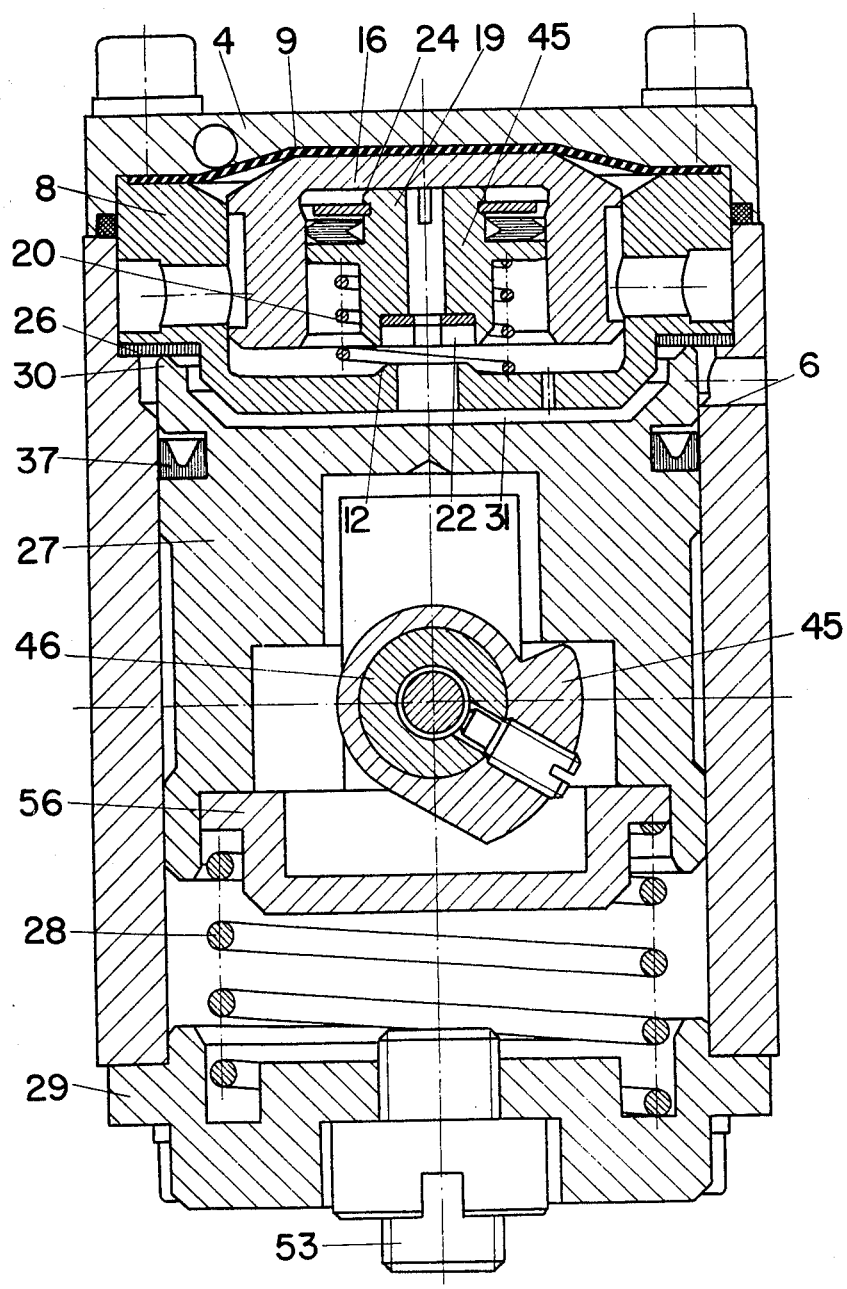
FIG. 3 is a cross-sectional view of the arrangement of FIG. 2, taken substantially along the line III—III thereof.

FIGS. 2 and 3 illustrate a further exemplary embodiment of positioning or adjustment device, the control portion or section of which is constructed analogous to the exemplary embodiment discussed previously in conjunction with FIG. 1. As also mentioned previously in the embodiment of FIGS. 2 and 3 there have been generally used the same reference characters for the same or analogous elements as discussed above in conjunction with the description of the embodiment of FIG. 1.

The difference between the exemplary embodiment of FIGS. 2 and 3, in contrast to the described embodiment of positioning device of FIG. 1, particularly resides in the fact that the positioning piston 27 does not actuate a Bowden cable, rather acts upon a lever 45 located at a shaft 46. At the shaft 46 there is pivotably mounted the air flap valve or valve member 47 in the air suction line or conduit. The shaft 46 is mounted in the housing 1 of the positioning device, here formed of one piece with a pipe section 48 of the air charging line which contains the air flap valve 47. To both sides of the air flap valve 47 the pipe section 48 is provided with flanges 49 for connection with the charging air line. At the shaft 46 there engages a helical spring 50, which bears at a housing cover 51 which is laterally held at the housing 1 of the positioning device. The spring 50 is arranged and designed such that the air flap valve 47 can be retained in its closed position by the spring force. The spring 50 of FIG. 2 thus corresponds to the spring 40 of the arrangement of FIG. 1. Here, the housing cover 51 also serves as an anti-friction bearing for the shaft end.

In order to enable passage of the shaft 46 and for the rotation of the shaft 46 by means of the lever 45 against the force of the spring 50, the positioning piston 27 advantageously possesses a longitudinal slot 52. The stroke of the positioning piston 27 is adjusted by means of a screw 53 or the like provided in the housing base or bottom 29.

For connecting the charging air line from a location in the flow direction forwardly of the air flap or valve 47 with the connection or port 5 there are provided in the housing 1 and in the tube jacket of the charging air line section 48 the bores 54, 55. The connection or port 6 for the oil infeed or impingement line and the connection or port 7 for the oil return flow line, in the embodiment of FIGS. 2 and 3 under discussion, are shown shifted through 90° with respect to one another. Since in this case the positioning device is arranged directly at the charging air line, special lines must lead from the engine to the connections or ports 6 and 7, something not required for the arrangement of FIG. 1 since there the positioning device is secured by means of its adjacently situated connections 6 and 7 directly at the engine housing, and these connections or ports 6 and 7 merge with the oil infeed bore and oil return bore. In this case, in contrast to the embodiment of FIG. 1, a special air line or conduit must lead between the charging air line and the air connection or port 5. By virtue of the particular design of the positioning piston 27 at the side of the control section it is possible to maintain particularly compact in dimension the axial length of the positioning device of the embodiment of FIGS. 2 and 3. The square sleeve 16 is here provided with a groove 14′ at its outer periphery, which corresponds to the groove 14 of the arrangement of FIG. 1.

The spring 28 for the return of the positioning piston 27 back into its rest position, with the embodiment of FIGS. 2 and 3, bears by means of a cap-like part 56 at the positioning piston 27. It should be clear that the spring 28 can be provided with an appropriate wear protection of the type discussed previously in conjunction with the embodiment of FIG. 1.

The positioning device of the embodiment of FIGS. 2 and 3 functions in all other respects in corresponding manner to that described in conjunction with the positioning device of the arrangement of FIG. 1, so that it is believed unnecessary to further discuss in detail its mode of operation.

Finally, it is mentioned that the invention is not limited to the specific exemplary embodiments disclosed in conjunction with FIGS. 1 to 3 herein. Thus, with the benefit of the teachings and concepts of the invention, persons skilled in the art will be readily capable of carrying out variations in the construction and design of the positioning device, which nonetheless still fall within the spirit and scope of the invention. Thus, by way of example and not limitation, the housing insert element 8 also can be formed of one-piece with the housing portion 2. The configuration of the sleeve 16 and the control piston 19 can be undertaken in different ways, provided there is fulfilled the condition that with the shutoff valve 12, 22 open the connection between the impingement chamber 31 and the oil return flow line is freed and is not restrained or limited by the sleeve 16. Furthermore, there should be ensured that with the shutoff valve 12, 22 closed the impingement chamber or compartment 31 is essentially tightly sealed from the oil return flow line. The bore 45 in the control piston 19 should be dimensioned to be so narrow that, with the presence of the oil pressure in the impingement or infeed line, it cannot cause opening of the shutoff valve 12, 22, but however upon collapse of the oil pressure contributes to the rapid opening of the shutoff valve 12, 22.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A positioning device for an air flap valve arranged in the charging air line of a diesel engine, comprising:
   a shutoff valve provided for the air flap valve;
   said shutoff valve being incorporated into a flow path between an impingement line branching-off from a pressure oil line of the diesel engine and an oil return flow line;
   an impingement chamber with which there is connected said impingement line;
   a positioning piston arranged within said impingement chamber and serving to actuate the air flap valve;
   means defining a continuously effective force for loading said positioning piston;
   said shutoff valve including a control piston;
   said shutoff valve being actuatable by means of said control piston in order to impinge the positioning piston with oil in the opening direction of the air flap valve;
   a spring acting upon said control piston;
   said control piston being loaded by the pressure prevailing in the charging air line against the force of said spring;
   said shutoff valve being interposed between the impingement chamber and the oil return flow line;
   said shutoff valve in the presence of oil pressure for impinging the positioning piston with pressurized oil, being moved by the charging air pressure in the charging air line out of its open position into its closed position; and
   said closed shutoff valve, only with an absence of oil pressure being controlled by the spring force of the spring from its closed position into its open position, in order to relieve the positioning piston from the action of the oil pressure.

2. The positioning device as defined in claim 1, further including:
   a control chamber in which there is arranged said control piston;
   said shutoff valve including a fixed valve seat;
   said control chamber being connected with the oil return flow line for closing by means of said control piston said valve seat of the shutoff valve;
   a valve plate having a central opening and provided for said control piston;
   said central opening of the valve plate flow communicating with an opening extending through said control piston;
   a guide sleeve within which there is guided in a pressure-tight fashion the control piston;
   said guide sleeve being guided to be axially displaceable in the control chamber and being open in the direction of the shutoff valve and further having a closed end;
   said guide sleeve having a closed end which faces away from the valve seat of the shutoff valve;
   a diaphragm closing the control chamber;
   said closed end of said guide sleeve bearing against the diaphragm; and
   said diaphragm being impinged by charging air.

3. The positioning device as defined in claim 2, wherein:
   said control piston is provided with a piston seal;
   said control piston having a bore located between said piston seal and the valve plate;
   said bore flow communicating spaces located to both sides of the control piston.

4. The positioning device as defined in claim 2, further including:
   a housing containing said positioning piston;
   said impingement chamber being bounded at one end by the positioning piston and at the other end by means defining a partition wall fixed to said housing and separating the impingement chamber from the control chamber; and said partition wall having an opening which is encircled within the control chamber by the valve seat of the shutoff valve.

5. The positioning device as defined in claim 4, wherein:
said positioning piston in a rest position thereof, with the air flap valve closed, sealingly bearing by means of a valve-seat like protruding edge at a sealing surface bearing at the partition wall;
said housing having an inner ring-shaped housing chamber bounding connection means leading to the impingement line; and
said inner ring-shaped housing chamber being connected by means of a narrow bore provided at the positioning piston with the impingement chamber.

6. The positioning device as defined in claim 1, wherein:
said positioning piston has a side facing away from the oil-pressure impingement chamber;
spring means for continuously acting against said side of the positioning piston;
said spring means bearing against a base of the positioning device; and
said spring means retaining said positioning piston in a rest position in the absence of oil pressure.

7. The positioning device as defined in claim 6, further including:
a shaft provided for the air flap valve;
a lever fixed to said shaft;
a Bowden cable engaging with said lever for controlling the air flap valve;
said Bowden cable having a free end;
a pressure element retained coaxially with respect to the positioning piston and located within a chamber of the positioning piston housing said spring means;
the free end of the Bowden cable being anchored at said pressure element;
a spring member acting upon the pressure element;
said pressure element in the rest position of the positioning piston being held by the force of said spring member in its rest position and at a slight spacing from the rest position of the positioning piston.

8. The positioning device as defined in claim 7, wherein:
the positioning piston during displacement by means of the oil pressure traveling against the pressure element against the force of its spring member and displacing said pressure element in order to open the air flap valve against the force of the spring member of the pressure element; and
the pressure element being retained at the positioning piston in a position which is centered in relation to the positioning piston.

9. The positioning device as defined in claim 7, wherein:
said positioning device is flanged to an engine housing to avoid the use of oil pressure and oil return flow lines.

10. The positioning device as defined in claim 6, wherein:
said positioning piston has a spring-loaded space;
a shaft transversely piercingly extending through the spring-loaded space of the positioning piston;
said air flap valve being retained at said shaft;
a housing for said positioning piston;
a torsion spring engaging at said shaft;
said torsion spring being supported at an element fixed at said housing;
said torsion spring retaining the air flap valve in its closed position;
a lever fixed to said shaft;
said positioning piston, when impinged by the oil pressure, contacting said lever and thereby actuating said shaft; and
said shaft pivoting the air flap valve into its open position against the force of the torsion spring.

11. The positioning device as defined in claim 10, wherein:
said positioning device is flanged to an air suction pipe.

12. The positioning device as defined in claim 10, wherein:
said housing of said positioning device is formed of one-piece with a portion of an air charging line containing the air flap valve.

* * * * *